(12) United States Patent
Zhao et al.

(10) Patent No.: US 11,499,717 B2
(45) Date of Patent: Nov. 15, 2022

(54) COMBUSTION CHAMBER

(71) Applicant: Zhejiang Liju Boiler Co., Ltd., Hangzhou (CN)

(72) Inventors: Rongxin Zhao, Hangzhou (CN); Guoliang Chen, Hangzhou (CN); Yongqiang Wang, Huzhou (CN); Erpeng Qiu, Hangzhou (CN); Bingyuan Shen, Hangzhou (CN)

(73) Assignee: Zhejiang Liju Boiler Co., Ltd., Hangzhou (CN)

( * ) Notice: Subject to any disclaimer, the term of this patent is extended or adjusted under 35 U.S.C. 154(b) by 102 days.

(21) Appl. No.: 15/671,124

(22) Filed: Aug. 7, 2017

(65) Prior Publication Data
US 2019/0041062 A1 Feb. 7, 2019

(51) Int. Cl.
| | |
|---|---|
| *F23R 3/42* | (2006.01) |
| *F23C 99/00* | (2006.01) |
| *F23D 14/78* | (2006.01) |
| *F23D 11/36* | (2006.01) |
| *F23D 14/82* | (2006.01) |
| *F23D 14/02* | (2006.01) |
| *F23D 14/26* | (2006.01) |
| *F23H 3/02* | (2006.01) |

(52) U.S. Cl.
CPC .............. *F23R 3/42* (2013.01); *F23C 99/008* (2013.01); *F23D 11/36* (2013.01); *F23D 14/02* (2013.01); *F23D 14/26* (2013.01); *F23D 14/78* (2013.01); *F23D 14/82* (2013.01); *F23C 2203/10* (2013.01); *F23H 3/02* (2013.01); *F23H 2900/03021* (2013.01); *F23R 2900/03044* (2013.01)

(58) Field of Classification Search
USPC .............................. 431/353; 122/18.4, 448.3
See application file for complete search history.

(56) References Cited

U.S. PATENT DOCUMENTS

| | | | | |
|---|---|---|---|---|
| 4,413,590 A | * | 11/1983 | Landreau | ................... F24H 1/40 122/16.1 |
| 4,815,535 A | * | 3/1989 | Hagemeister | ............. F28D 7/06 165/163 |

(Continued)

*Primary Examiner* — Steven B McAllister
*Assistant Examiner* — John E Bargero
(74) *Attorney, Agent, or Firm* — Kilpatrick Townsend & Stockton LLP

(57) ABSTRACT

Embodiments provide a combustion structure that can achieve stable combustion by addressing the aforementioned drawbacks in the prior art such as low flame stability, backfire, deflagration, blockage and/or any other drawbacks. The combustion chamber structure in accordance with the disclosure can include: a grate structure including a first set of elongated components, a fire retention structure including a second set of elongated components. The first set of first elongated components can be arranged along an axial direction within the combustion chamber structure. The second set of elongated components can be arranged along the axial direction in a same direction as the first elongated components. The second set of elongated components can be configured to generate a negative pressure zone within the combustion chamber. The first set of elongated components can form apertures that can be aligned with apertures formed by the second set of elongated components.

13 Claims, 7 Drawing Sheets

(56) References Cited

U.S. PATENT DOCUMENTS

| | | | |
|---|---|---|---|
| 2004/0050537 A1* | 3/2004 | Kim | F25B 39/04 |
| | | | 165/115 |
| 2009/0183661 A1* | 7/2009 | Furukawa | F23J 15/02 |
| | | | 110/215 |
| 2010/0313827 A1* | 12/2010 | Moore | F24H 9/2035 |
| | | | 122/37 |
| 2013/0224671 A1* | 8/2013 | Carey | F23Q 7/10 |
| | | | 431/253 |

* cited by examiner

COMBUSTION CHAMBER

BACKGROUND OF THE INVENTION

Embodiments relate generally to combustion chambers, particularly to improvements in combustion chambers having a fire grate and/or any other components.

NOx emissions are known as an important cause for the formation of nitric acid and haze. Because of these environmental concerns, the study of combustion technology for higher combustion efficiency and lower NOx emission is ongoing worldwide. Diffusion combustion is a type of burning technology that is widely used. However, diffusion combustion typically has flaws such as incomplete combustion and high NOx emission. As improvement, premixed combustion burners have been developed to achieve more efficient combustion and lower NOx emission. These burners typically have burner heads that are normally cylindrical with a layer of high temperature resistant metallic fiber woven mesh or ceramic mesh such that flame sits on its outside surface. These burners can allow more sufficient and efficient combustion as compared to diffusion combustion burners.

However, existing premixed burners have several drawbacks. These burners typically have poor flame stability and thus are prone to backfire and deflagration. These burners are also prone to clogging because of fine woven mesh. These burners can cause high NOx emissions at low excess air.

BRIEF SUMMARY OF THE INVENTION

In general, embodiments provide a combustion structure that can achieve stable combustion by addressing the aforementioned drawbacks in the prior art such as low flam stability, backfire, deflagration, blockage and/or any other drawbacks. The combustion chamber structure in accordance with the disclosure can include: a grate structure including a first set of elongated components. The first set of first elongated components can be arranged along an axial direction within the combustion chamber structure. In implementations, the first set of elongated components can include a first elongated component and a second elongated component. The first elongated component and second elongated component can be arranged such that there is a first aperture between the first elongated component and second elongated component.

In some embodiments, the combustion chamber can include a flame retention structure having a second set of elongated components. The second set of elongated components can be arranged along the axial direction in a same direction as the first elongated components. The second set of elongated components can be configured to generate a negative pressure zone within the combustion chamber. In implementations, the second set of elongated components can include a third elongated component and a fourth elongated component. The third elongated component and fourth elongated component can be arranged such that there is a second aperture between the third elongated component and fourth elongated component. The aforementioned first aperture and second aperture can be aligned such that the first aperture and the second aperture overlap and/or interleave with each other.

In various embodiments, one or more of the following features are provided. In some embodiments, a side surface of the first elongated component and a side surface of the second elongated component in the first set of elongated components are both rectangular. In some embodiments, the first elongated component and/or second elongated component are rectangular tubes. In some embodiments, a width of the first aperture can less than or equal to 2 millimeters. In some embodiments, the first and second elongated component can each include a channel. The channel can be configured to allow a cooling medium to flow through the channel. In some embodiments, the third and fourth elongated components can each include such a channel. In some embodiments, the third and fourth elongated components may circular tubes. In some embodiments, the axial direction along which the first set and second elongated components are arranged is a longitudinal axis through a center of the combustion chamber structure.

In some embodiments, a burner is provided. The burner in accordance with the disclosure can have a grate structure, a flame retention structure, a first cooling pipe, a second cooling pipe and/or any other components. The grate structure may comprise a first set of elongated components similar to those described above as being included in the combustion chamber structure. The flame retention structure may comprise a second set of elongated components similar to those described as being included in the combustion chamber structure. The first cooling pipe can be configured to be in fluid communication with the first set of elongated components, and the second cooling pipe can be configured to be in fluid communication with the second set of elongated components.

In some embodiments, the first cooling pipe can allow a cooling medium to flow into the first set and second set of elongated components at a distal end of the burner and flow out of the first set and second set of elongated components at a proximal end of the burner into the second cooling pipe. In some embodiments, the burner includes a burner inlet configured to receive a burning medium at the proximal end of the burner. In some embodiments, the burning medium includes a mixture of gas combustible gas such as natural gas and Oxygen air.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

DETAILED DESCRIPTION OF THE INVENTION

Figure 1:
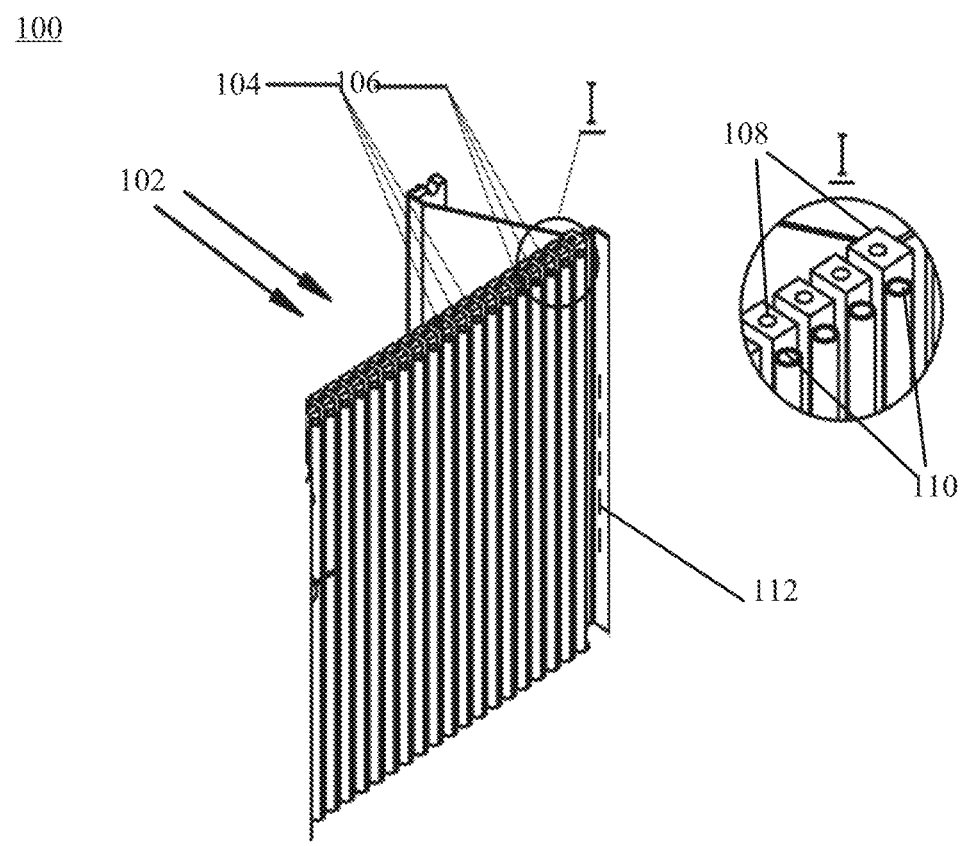
FIG. 1 is a diagram showing an exemplary combustion chamber in accordance with the disclosure.

FIG. 1 is a diagram showing an exemplary combustion chamber 100 in accordance with the disclosure. As shown, the combustion chamber 100 can include a grate structure 104, a flame retention structure 106, and/or any other components. As also shown, a burning medium 102, such as a premixed gaseous fluid can be injected toward the grate structure 104 and the flame retention structure 106 for combustion in a combustion zone (not shown in this figure for the sake of clear illustration) around or near those two structures. As still shown, the grate structure 104 and the flame retention structure 106 can be arranged both along an axis 112. In this example, the axis 112 is a vertical (or substantially vertical) axis with respect to the direction in which the burning medium 102 is injected. However, it should be understood that this is not intended to be limiting. In some other examples, the axis 112 may not be vertical with respect to the direction in which the burning medium 102 is injected. For instance, the axis 112 can be diagonal with respect to the direction in which the burning medium 102 is injected. The direction of the axis 112 may be a design choice depending on an application of combustion chamber 100 and thus is not limited.

Attention is now directed to the grate structure 104 and the flame retention structure 106. The grate structure 104 can be configured to retain the burning medium 102 for combustion in the combustion zone. As shown, the grate structure 104 can comprise a set of elongated components 108. The elongated components 108 in the grate structure 104 can be arranged along the axis 112 to form apertures in between the elongated components.

Figure 2A:
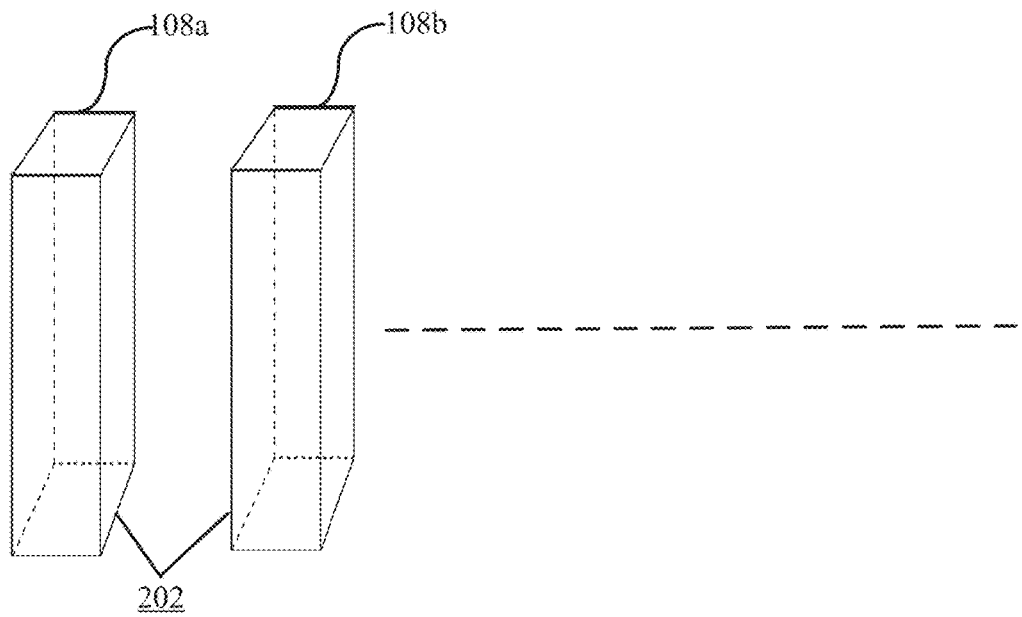
FIG. 2A illustrates one example of the elongated components shown in FIG. 1.
Figure 2B:
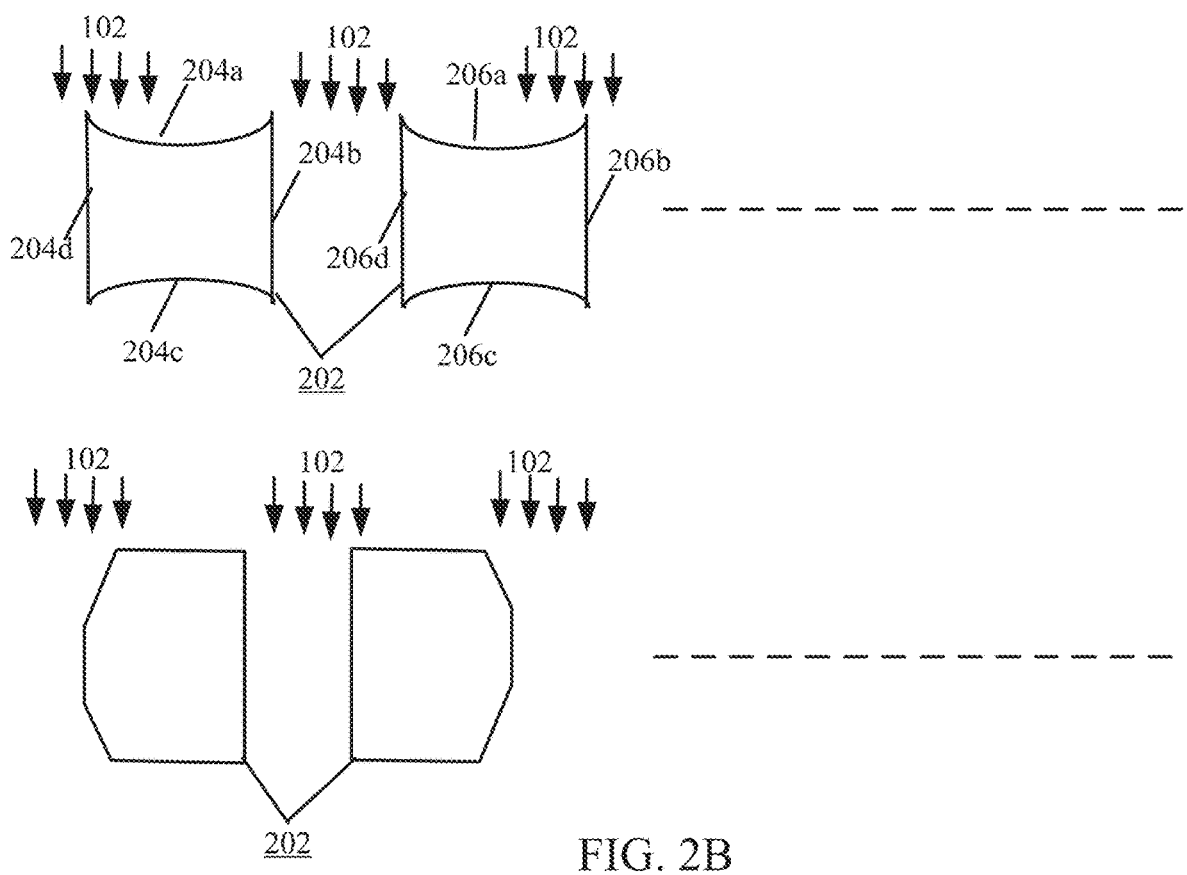
FIG. 2B illustrates some other examples of the elongated components in top views.

FIG. 2A illustrates one example of the elongated components 108 shown in FIG. 1. As shown in this example, an individual elongated component 108 in the grate structure 104 can have a rectangular volume, for example can be a rectangular tube in some implementations. However, it should be understood this is not necessarily the only case. FIG. 2B illustrates some other examples of the elongated components 108 in top views. For instance, as shown in the top portion of FIG. 2B, the individual elongated components 108 can have four side faces, such as 204a-d and 206a-d. As shown, side faces 204a and 206d form an aperture 202. As shown, for forming the aperture 202, the side faces 204a and 206d may be flat. However, as can be seen, the other non-aperture-forming side faces 204a and 204c, and 206a and 206c need not be flat. The bottom portion of FIG. 2B illustrates another example of elongated components 108. In this example, the individual elongated components 108 have 5 sides. In general, the number of sides and/or the shape of the elongated components 108 are not limited so long as apertures 202 are formed by the elongated components 108.

The width of an aperture 202 is also not limited. One skill in the art will understand that the width of aperture can be a design choice depending on the application of chamber 100. However, for optimal flame retention, in some embodiments, the width of aperture 202 can be controlled no more than 2 millimeters. Referring back to FIG. 1, in the example shown in FIG. 1, the elongated components 108 are arranged in space evenly to form apertures having more or less the same width. This is also not intended to be limiting. In some other examples, the apertures formed by the elongated components 108 may not all have the same width. In those examples, the elongated components 108 may not be arranged in space evenly. The number of elongated components 108 that can be included in the grate structure 104 is also not limited. In some examples, the grate structure 104 may include as few as several elongated components 108, while in some other examples the grate structure 104 may include as many as hundreds elongated components 108.

The flame retention structure 106 can include a set of elongated components 110. As shown, the elongated components 110 can be arranged along the same axis, i.e. axis 112 in this example, as the elongated components 108. An insight provided by the inventor(s) is that the elongated components 110 can be installed in addition to the elongated components 108 to improve flame retention in the combustion chamber 100. The arrangement of the elongated components 110 as shown can function as a blunt body to help prevent flame backfire, and thus improve flame stability to maintain continuous and complete combustion. For achieving this, the elongated components can be configured to generate negative pressure zone in the primary combustion zone.

Figure 3:
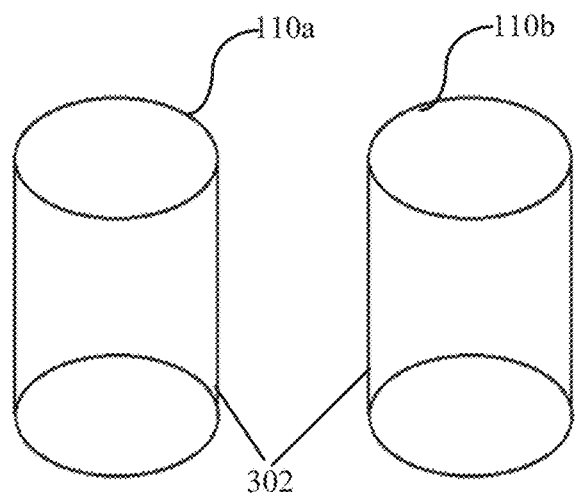
FIG. 3 shows examples of elongated components in accordance with the disclosure.

FIG. 3 shows examples of elongated components 110 in accordance with the disclosure. In this example, the elongated components 110a and 110b are both round tubes and form an aperture 302. Aperture 302 can create a resistance to reduce pressure after the burning medium flows through the aperture 302. This can make the pressure of the combustion zone lower than the zone where the burning medium come from (e.g., in an area where a burner inlet is arranged). This pressure difference can prevent backfire. In implementations, the shape of the elongated components 110 is not limited. Although in this example the elongated components 110 are round tubes, they can have other shapes in some other examples (e.g., a rectangular volume, hexagon volume, or any other shape).

Referring back to FIG. 1, in some embodiments, the elongated components 110 can be installed below the elongated components 108, as shown in this example. However, this is not intended to be limiting. It is contemplated that the elongated components 108 can be arranged to have more or less the same height as the elongated components 110. As also shown, the elongated components 108 can be attached to the elongated components 110. However, this is also not intended to be limiting. It is contemplated that there may be some a gap or space between the elongated components 110 and 108.

Figure 4A:
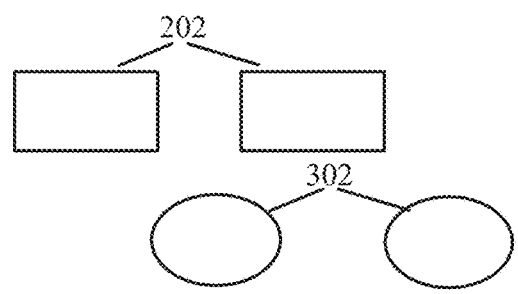
FIG. 4A illustrates one example of arranging apertures of the elongated components shown in FIG. 1.
Figure 4B:
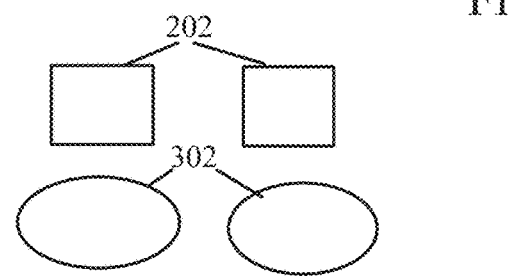
FIG. 4B illustrates another example of arranging apertures of the elongated components shown in FIG. 1.
Figure 4C:
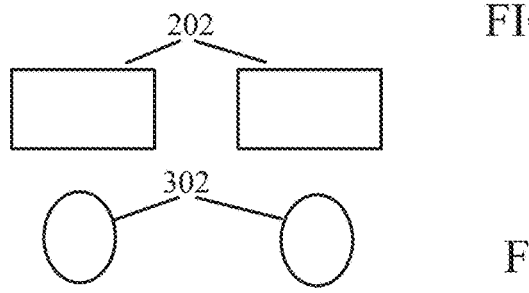
FIG. 4C illustrates still another example of arranging apertures of the elongated components shown in FIG. 1.

In this example, the elongated components 110 are aligned with the elongated components 108 such that the apertures of the elongated components 108 and the apertures of the elongated components 110 correspond to each other. In this example, the width of the aperture 202 and the width of the aperture 302 is more or less the same and a given aperture 202 corresponds to a given a given aperture 302 in an interleaving fashion. This is shown in FIG. 4A. However, this is not intended to be limiting. As shown in FIG. 4B, in some embodiments while the apertures 202 and 302 are aligned by overlapping, the width of the apertures 202 can be bigger than that of apertures 302. As shown in FIG. 4C, in some embodiments while the apertures 202 and 302 are aligned, the width of the apertures 202 can be shorter than that of apertures 302. Other examples of aligning apertures 202 and 302 are contemplated.

Referring back to FIG. 1, the burning medium can include any substance suitable for combustion within combustion chamber 100. In some embodiments, the burning medium 102 may include a gaseous mixture, which may include one or more gases and air. For example, the burning medium 102 can include hydrocarbon, mixing with air (or oxygen) evenly to form premixed air in a certain concentration range, and burning as well as releasing gases with large amounts of energy when exposed to an ignition source, such as methane ($CH_4$), hexane ($C_2H_6$), propane ($C_3H_8$), etc., commonly used are natural gas, liquefied petroleum gas, city and so forth. However, this is not intended to be limiting. In some examples, the burning medium 102 may include other combustible particles, such as coal.

Figure 5:
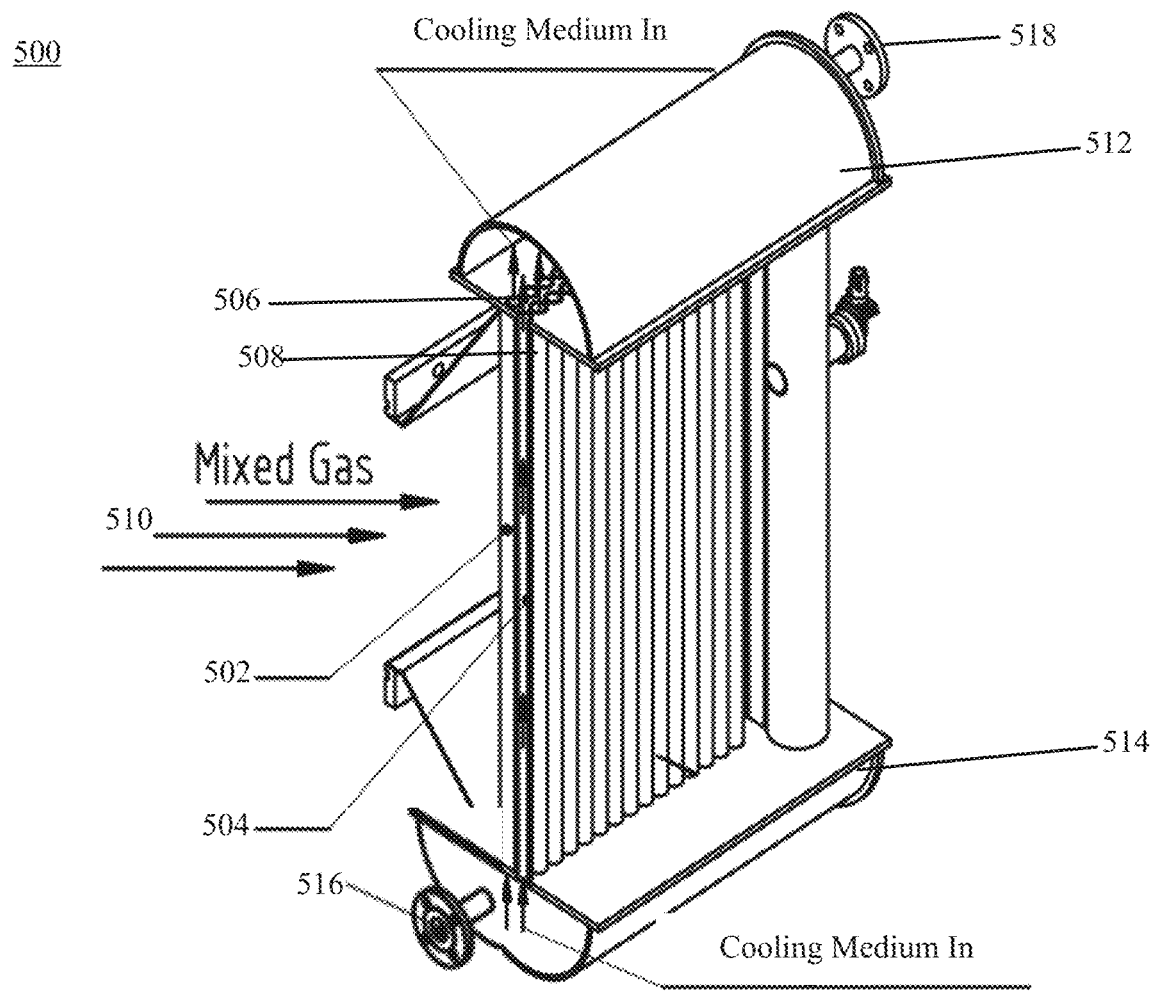
FIG. 5 illustrates one example of a burner in accordance with the disclosure.

With the combustion chamber 100 having been described and illustrated, attention is now directed to FIG. 5, where an example of a burner 500 is illustrated. In this example, the burner 500 includes a grate structure 502 substantially similar to or the same as the grate structure 104 described and illustrated herein. The burner 500 also includes a flame retention structure 504 substantially similar to or the same as the flame retention structure 106 described and illustrated herein. In this example, the elongated components 506 in the grate structure 502 are rectangular tubes and the elongated components 508 in the flame retention structure 504 are round tubes. Each of the elongated component 508 in this example comprises a channel through the elongated component 508. Each of the elongated component 510 in this example also comprises a channel through the elongated component 510. As shown, both of the elongated components 506 and 508 can be welded to an upper manifold 512 and a lower manifold 514. As also shown, a cooling medium, such as cooling water or cooling oil, can circulate in the channels of the elongated component 508 and elongated components 510 for controlling flame temperature, inhibiting the formation of NOx, stabilizing the flame, and/or for any other purposes.

In the example shown in FIG. 5, the burner 500 includes a cooling medium inlet, from which the cooling medium can enter the lower manifold 514 and circulate within grate structure 502 and flame retention structure 504 through the channels of the elongated components 506 and 508. As shown, because of combustion happens at the area where the mixed gas enter into burner 500, the cooling medium flows through the grate structure 502 and the flame retention structure 504 from bottom to top, and discharges from the cooling water outlet 518 of upper water manifold 512 on the top. In this way, the cooling medium can absorb heat from grate structure 502 and flame retention structure 504, which can absorb the radiant heat of the burning flame. The temperature of cooling medium can rise or in some instances the cooling medium can became steam. It should be understood, the arrangement of the upper and lower manifolds 512 and 514, the inlet 516 shown in this example is not intended to be limiting. These components of the burner 500 can be arranged differently in some other examples according to actual conditions.

Figure 6:
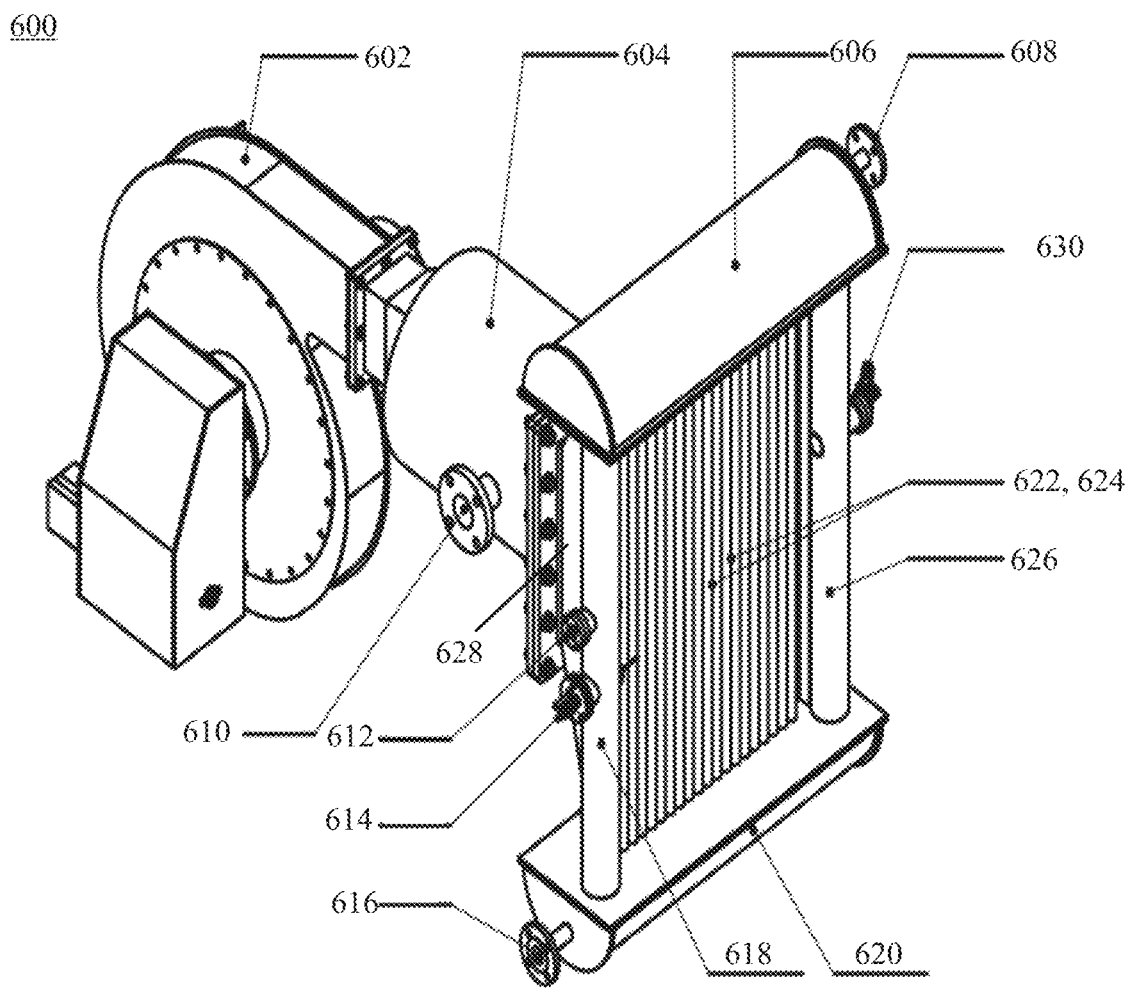
FIG. 6 illustrates a side view of the burner shown in FIG. 5.
Figure 7:
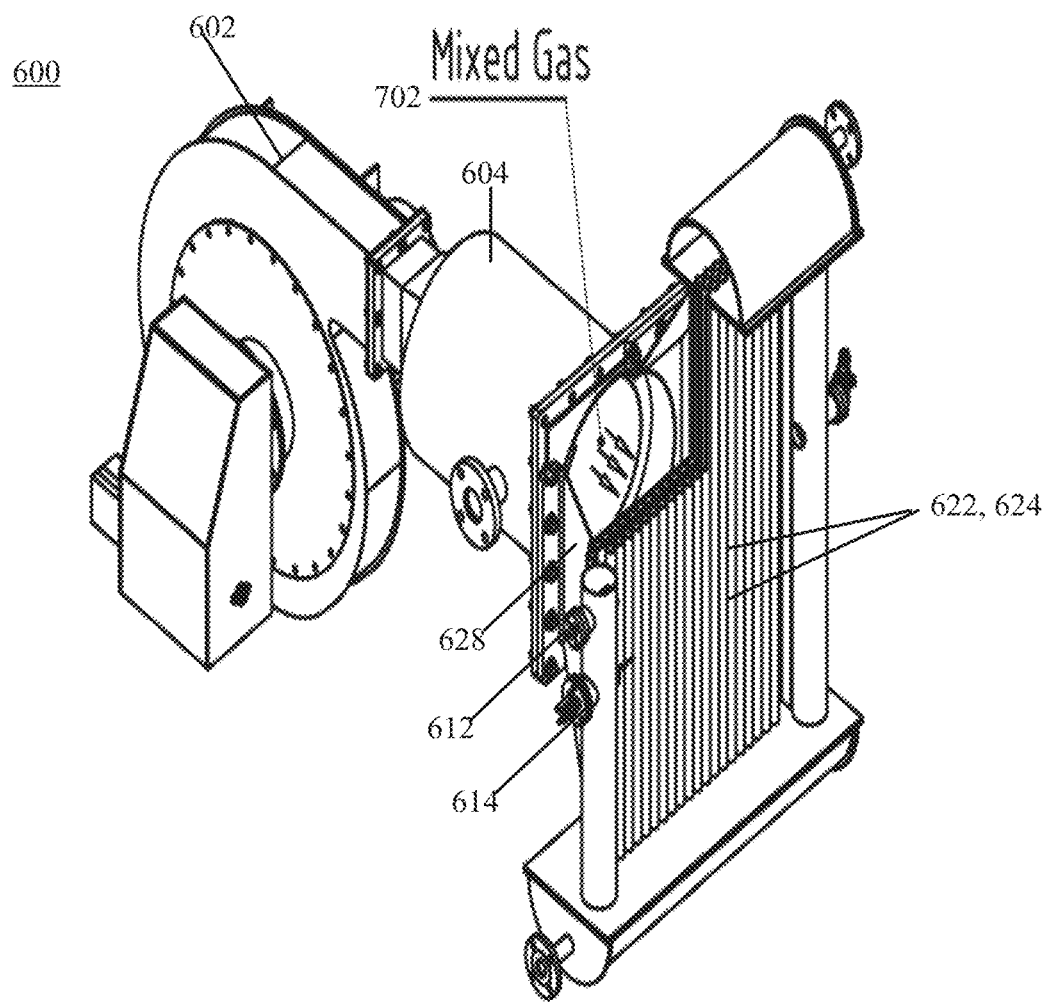
FIG. 7 illustrates another side view of the burner shown in FIG. 5.
Figure 8:
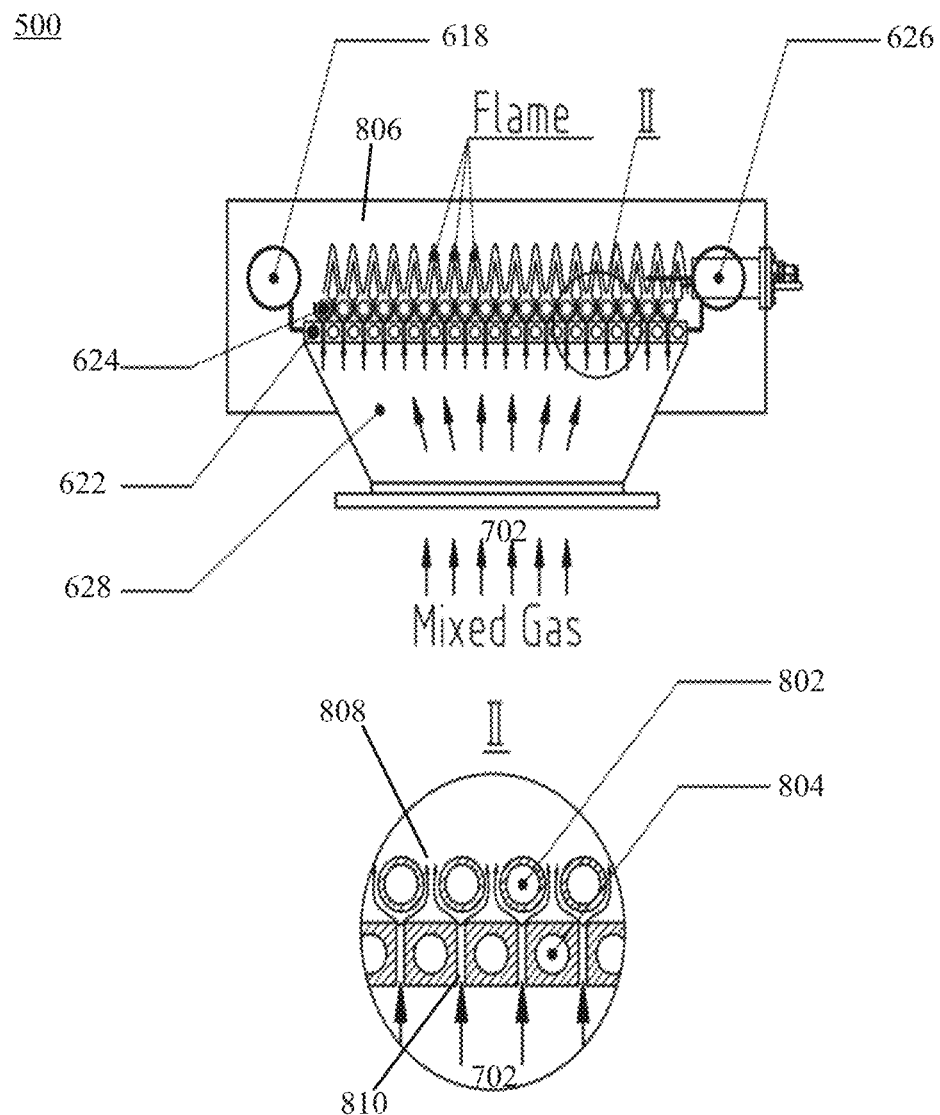
FIG. 8 illustrates a top view of the burner shown in FIG. 5.

FIGS. 6-8 illustrate another example of a burner 600 in accordance with the disclosure. As can be seen from FIG. 6, the burner 600 can include a grate structure 622, a flame retention structure 624, a upper manifold 606, a lower manifold 620, a isobaric chamber 628, an ignition device 614, a fire inspection via 612, a flame detector 630, communicating pipe 618 and 626, a blower 602, a mixer 604, a gas inlet 614, a cooling medium inlet 616, a cooling medium outlet 608 and/or any other components. FIG. 7 illustrates combustible gas can enter the isobaric chamber 628 through the gas inlet 612. The mixer 604 can mix the gas with air according to a predetermined ratio to provide mixed gas 702 for combustion. Air can be injected into the mixer 604 by the blower 602.

FIG. 8 illustrates a top view of the burner 600 when mixed gas 702 continuously flows into isobaric chamber 628. The mixed gas 702 can then be uniformly distributed to the apertures 810 of the grate structure 622 for combustion in the combustion zone 806. As described, the elongated component 802 in the flame retention structure 624 can function as blunt body to prevent backfire of the flame in the combustion zone 806. In this example, as shown, the apertures 810 formed by the elongated components 804 in the grate structure 622 correspond to the apertures 808 in an interleaving fashion. The mixed gas 702 can burn quickly with short blue flame. Typically, the flame length is not more than 150 mm. As shown, the communicating pipe 618 and communicating pipe 626 can be installed on the two sides of flame retention structure 624 as strengthening pipes. In implementations, the communicating pipes 618 and 626 can be round pipes, and welded to upper manifold 606 and lower water manifold 620, to strengthen the burner structure, and also to prevent radiative heat loss to the sides. In some examples, the communicating pipes 618 and/or 626 can be configured to circulate the cooling medium.

Referring back to FIG. 6, the flame detector 630 can be installed at the center of the communicating pipe 626, and can be used to capture the flame signal for the safety of the operation. The ignition device 614 and a fire inspection via 612 can be installed at the center of the communicating pipe 618. In some examples, the ignition device 614 can be configured to apply high voltage electronic ignition. In some embodiments, the burner 600 can be made of stainless steel or other suitable materials. In some embodiments, burner 600 can be installed horizontally. In some other embodiments, burner 600 can be installed vertically or in other direction.

The specification and drawings are, accordingly, to be regarded in an illustrative rather than a restrictive sense. It will, however, be evident that additions, subtractions, deletions, and other modifications and changes may be made thereunto without departing from the broader spirit and scope. Illustrative methods and systems for providing features of the present disclosure are described above. Some or all of these systems and methods may, but need not, be implemented at least partially by architectures such as those shown in FIGS. 1-12 above.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

What is claimed is:

1. A combustion chamber comprises:
a gas inlet for providing a mixed gas to the combustion chamber, an ignition device, and a grate structure, wherein
the grate structure comprises a first set of tubes and a second set of tubes proximal to the first set of tubes, wherein the first set of tubes are arranged to form first set of apertures between each of the first set of tubes, the second set of tubes are arranged to form second set of apertures between each of the second set of tubes, wherein the first set of apertures and the second set of apertures are arranged in intervals along flow direction of the mixed gas;
the mixed gas from the gas inlet flows through the first set of apertures and the second set of apertures, and is ignited after flowing through the second set of apertures to form flames in the combustion chamber;
each of the second set of tubes forms a blunt body configured to generate a negative pressure zone in the combustion chamber after the second set of apertures and to prevent backfire;
each of the second set of tubes is aligned with one of the first set of apertures and is configured to split the mixed gas passing through one of the first set of apertures.

2. The combustion chamber of claim 1, wherein
a side surface of each of the first set of tubes is flat.

3. The combustion chamber of claim 1, wherein
each of the first set of tubes and the second set of tubes comprise a channel configured to allow a cooling medium to flow through the channel.

4. The combustion chamber of claim 1, wherein
each of the second set of tubes has a circular cross section.

5. The combustion chamber of claim 1, wherein the combustion chamber comprises a distal end and a proximal end; and wherein
the first set of tubes are distally positioned relatively to the second set of tubes within the combustion chamber.

6. The combustion chamber of claim 5, wherein the combustion chamber is configured such that a cooling medium flows into the first set of tubes from the distal end and flows out of the first set of tubes at the proximal end.

7. The combustion chamber of claim 5, wherein the combustion chamber is configured to receive a burning medium at the proximal end.

8. The combustion chamber of claim 1, wherein the first set of apertures each has a same size.

9. A burner comprising a combustion chamber, a first cooling pipe, and a second cooling pipe, wherein the combustion chamber comprises:
a gas inlet for providing a mixed gas to the combustion chamber, an ignition device, and a grate structure, wherein
the grate structure comprises a first set of tubes and a second set of tubes proximal to the first set of tubes, wherein the first set of tubes are arranged to form first set of apertures between each of the first set of tubes, the second set of tubes are arranged to form second set of apertures between each of the second set of tubes, wherein the first set of apertures and the second set of apertures are arranged in intervals along flow direction of the mixed gas;
the mixed gas from the gas inlet flows through the first set of apertures and the second set of apertures, and is ignited after flowing through the second set of apertures to form flames in the combustion chamber;
each of the second set of tubes forms a blunt body configured to generate a negative pressure zone in the combustion chamber after the second set of apertures and to prevent backfire;
wherein:
the first cooling pipe is in fluid communication with the first set of tubes and the second set of tubes at a distal end of the burner;
the second cooling pipe is in fluid communication with the first set of tubes and the second set of tubes at a proximal end of the burner; and
each of the second set of tubes is aligned with one of the first set of apertures and is configured to split the mixed gas passing through one of the first set of apertures.

10. The burner of claim 9, wherein the burner is configured such that
a cooling medium in the first cooling pipe flows into the first set and second set of tubes at the distal end of the burner and flows out of the first set and second set of tubes at the proximal end of the burner into the second cooling pipe.

11. The burner of claim 9, further comprising one or more strengthening pipes supporting the burner, wherein the one or more strengthening pipes comprise channels to allow a cooling medium to flow through the strengthening pipes.

12. The burner of claim 9, further comprising a flame detector to detect a presence of a flame in the burner.

13. The burner of claim 9, wherein the ignition device is configured to ignite a flame within the burner.

* * * * *